United States Patent
Aso et al.

(10) Patent No.: US 6,862,290 B1
(45) Date of Patent: Mar. 1, 2005

(54) LINE SWITCHING SYSTEM AND LINE SWITCHING UNIT OF DYNAMIC BAND VARIATION UNIT

(75) Inventors: Ikuo Aso, Koriyama (JP); Sakae Watanabe, Koriyama (JP); Isao Wada, Koriyama (JP); Kazumasa Azuma, Koriyama (JP)

(73) Assignee: Hitachi Telecom Technologies, Ltd., Fukushima-ken (JP)

( * ) Notice: Subject to any disclaimer, the term of this patent is extended or adjusted under 35 U.S.C. 154(b) by 0 days.

(21) Appl. No.: 09/305,452

(22) Filed: May 6, 1999

(30) Foreign Application Priority Data

May 12, 1998 (JP) ............................................. 10-128973

(51) Int. Cl.[7] .............................................. H04L 12/28
(52) U.S. Cl. ........................ 370/412; 370/468; 370/535
(58) Field of Search .............................. 370/230, 235, 370/395.4, 412–416, 468, 230.1, 228, 395.41, 238, 252, 419, 420, 463, 400, 352–356

(56) References Cited

U.S. PATENT DOCUMENTS

| 4,674,082 A | * | 6/1987 | Flanagin et al. ............. 370/535 |
| 5,748,615 A | * | 5/1998 | Riedel et al. ............. 370/230.1 |
| 5,943,343 A | * | 8/1999 | Hatta et al. ................. 370/468 |
| 6,442,166 B1 | * | 8/2002 | McDonald et al. ..... 370/395.41 |

* cited by examiner

*Primary Examiner*—Frank Duong
*Assistant Examiner*—Melanie Jagannathan
(74) *Attorney, Agent, or Firm*—Antonelli, Terry, Stout & Krauss, LLP

(57) ABSTRACT

A line switching system of a dynamic band variation unit (10) having a function of connecting a dynamic data terminal device (30A) to an opposing data terminal device (30B) through a number of trunk lines such as a dedicated line (21) or ISDN lines (22–24), wherein the quantity of data to be sent out to a trunk line is varied after the quantity of data to be stored to the dynamic band variation unit is adjusted by varying the communication speed of the data transmitted from the dynamic data terminal unit, when varying the data communication quantity of the data terminal device by increasing or decreasing the number of trunk lines.

2 Claims, 7 Drawing Sheets control flow of data reception

LINE SWITCHING SYSTEM AND LINE SWITCHING UNIT OF DYNAMIC BAND VARIATION UNIT

BACKGROUND OF THE INVENTION

1. Field of the Invention

The present invention relates to a communication system comprising data terminal devices where the data communication quantity is varied according to time, and more specifically, to a dynamic band variation unit and a switching method of a data communication quantity in a dynamic band variation unit used in the above communication system, allocating the data from the data terminal device to a plurality of lines for communication of the data according to the data communication quantity of the lines.

2. Description of the Prior Art

Heretofore, as a dynamic band variation communication method connecting a dynamic band variation unit coupling a data terminal device to another dynamic band variation unit connected to a data terminal unit through multiple lines, there is known a communication method wherein during communication of data from one data terminal device to an opposing data terminal device through one communication line, another communication line is connected, and the data to be transmitted is allocated to the multiple lines so that the transfer speed of the data is increased. In this case, a clock provided to the data terminal device is increased, and the data to be transmitted is temporarily stored in the dynamic band variation unit, so as to absorb the line delay generated between the plurality of lines. Then, the stored data is transmitted to the opposing data terminal device, thereby realizing dynamic band variation communication utilizing a plurality of lines.

When the number of communication lines being used is decreased by disconnecting a line while communicating data through a plurality of lines in the prior art dynamic band variation communication method, either the data communicated through the disconnected line is cancelled, or the clock provided to the data terminal device from the dynamic band variation unit is reduced according to the band being reduced when disconnecting the line, and the data stored to the device is cancelled.

However, according to the conventional method, there was a problem that the data to be transmitted from the data terminal device was not guaranteed. That is, some of the data transmitted from the data terminal device were lost when reducing the number of lines being connected, or data other than the data transmitted from the data terminal device were inserted in the data from the data terminal device when increasing the number of lines to be connected.

Therefore, according to the conventional method, the data communicated between the data terminal devices may become defective, and only a unit having a retransmission means was able to guarantee such data.

SUMMARY OF THE INVENTION

The object of the present invention is to solve such problems of the prior art. The present invention aims at providing a line switching system and a line switching unit in a communication method for transmitting data through a plurality of lines having various delay quantities which are selected according to the status of the lines, so as to prevent the data from being lost when the number of lines is increased during communication of the data.

Even further, the present invention aims at providing a line switching unit and a line switching system of a dynamic band variation unit, wherein the data storage quantity and the data output timing for each line is calculated based on the line delay time of the plurality of lines, thereby preventing any data from being lost.

In order to solve the problems, the present invention discloses a line switching system of a dynamic band variation unit having a function to connect a dynamic data terminal device to an opposing data terminal device through a plurality of trunk lines such as dedicated lines and ISDN (integrated service and digital network) lines, said line switching system adjusting the quantity of data stored in said dynamic band variation unit according to predetermined steps when the data communication quantity of said data terminal device is varied by the increase or decrease in the number of lines used as trunk lines, and when said quantity of data stored in said unit is in a predetermined relation with said data communication quantity of said trunk lines, varying the data quantity to be sent out to said trunk lines.

Moreover, the present invention discloses a line switching system of a dynamic band variation unit as mentioned above, wherein said line switching system further adjusts said quantity of data stored to said dynamic band variation unit by varying the communication speed of the data transmitted from the dynamic data terminal device before varying the data quantity to be sent out to said trunk lines, when varying said data communication quantity of the data terminal device.

Even further, the present invention discloses a line switching system of a dynamic band variation unit as mentioned above, wherein said line switching system further measures the line delay time determined by the difference between the line delay time of the line communicating the data and the line delay time of a line to be added, and sets the timing for transmitting data to different lines according to the line delay time of each line respectively, when increasing the number of lines.

Moreover, the present invention discloses a line switching system of a dynamic band variation unit as mentioned above, wherein said line switching system further transmits data to said additional line at the point of time where the quantity of stored data equals the product of the line delay time and the data communication speed of the lines excluding the line having the largest line delay time, when increasing the number of lines.

The present invention discloses a line switching system of a dynamic band variation unit as mentioned above, wherein said line switching system decreases a line at the point of time where no more of data is stored, when decreasing the number of lines.

The present invention further discloses a line switching unit comprising a means for controlling the switching of a plurality of lines, a means for measuring the line delay times of said plurality of lines, a means for storing data transmitted from a data terminal device to said unit, a means for allocating said data from said data terminal device to said plurality of lines, and a means for separately controlling a clock for receiving data from said data terminal device and a clock for transmitting data to said data terminal device, wherein said line delay times of said plurality of lines are measured and the data corresponding to said line delay times is stored in said unit, said data being transferred to an opposing data terminal device in line units with timing determined for each of said plurality of lines, so as to guarantee the data being communicated.

Moreover, the present invention discloses a line switching unit as mentioned above, wherein said clock for transmitting the data to said data terminal device is controlled to correspond to the line speed when receiving data from said line, so as to guarantee said data being communicated to said data terminal device.

According to the above mentioned invention, by allocating the data to a plurality of lines having various line delay times when communicating data from the data terminal device, the data transmitted from the data terminal device may be guaranteed while increasing or decreasing the data communication speed by connecting or disconnecting lines.

PREFERRED EMBODIMENT OF THE INVENTION

The preferred embodiment of the present invention will now be explained in detail with reference to the accompanying drawings.

Figure 1:
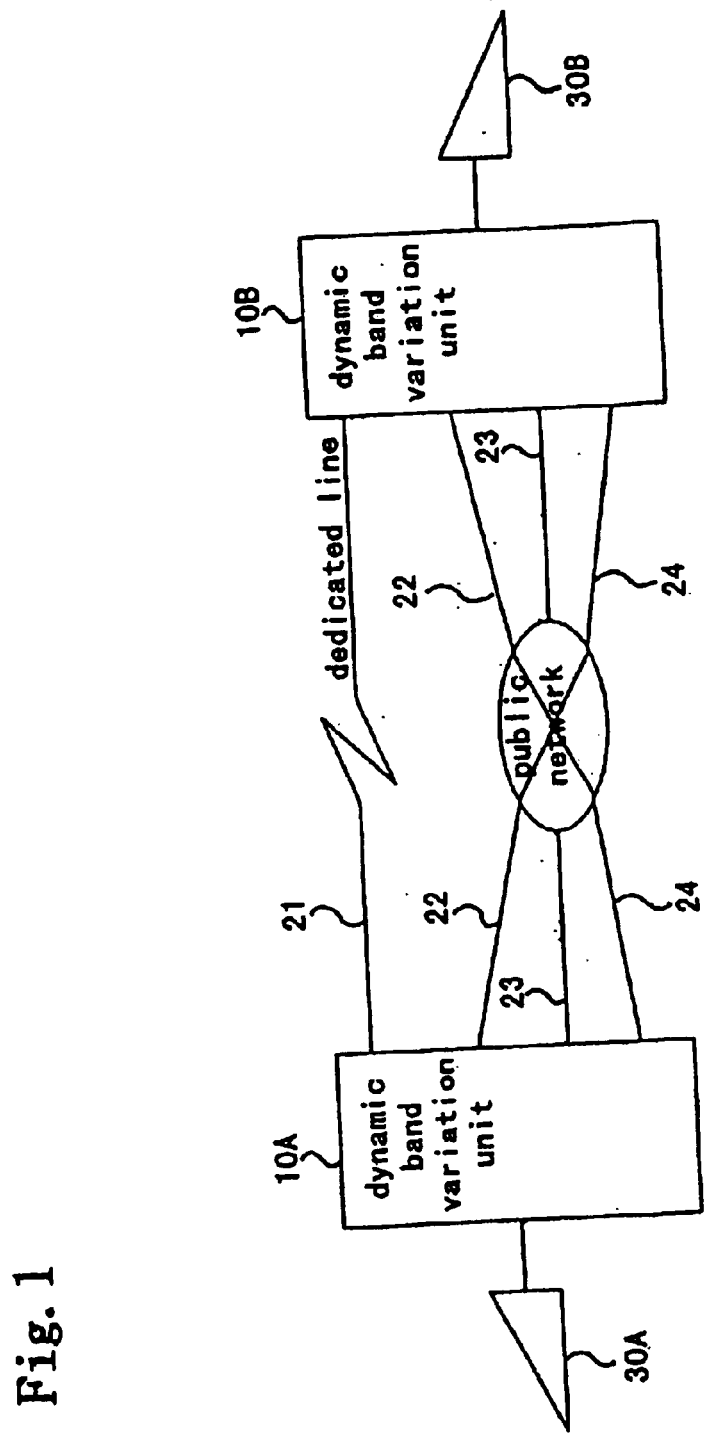
FIG. 1 is an explanatory view showing the composition of the dynamic band variation communication system to which the present invention is applied.

FIG. 1 is used to explain an example of the composition of the dynamic band variation communication system utilizing the dynamic band variation unit to which the present invention is applied.

The dynamic band variation communication system is composed of a dynamic band variation unit 10A working as a line switching unit (switching system) for a data terminal device (DTE) 30A, and a dynamic band variation unit 10B working as a line switching unit (switching system) for a data terminal device (DTE) 30B. Units 10A and 10B are connected by a plurality of trunk lines, such as a dedicated line 21, and line switching circuits 22, 23, 24 and the like.

In the present embodiment, the plurality of trunk lines are explained to be comprising a dedicated line 21 and line switching circuits 22 through 24, but the types or numbers of lines used as trunk lines are not limited to such in performing the present invention.

Figure 2:
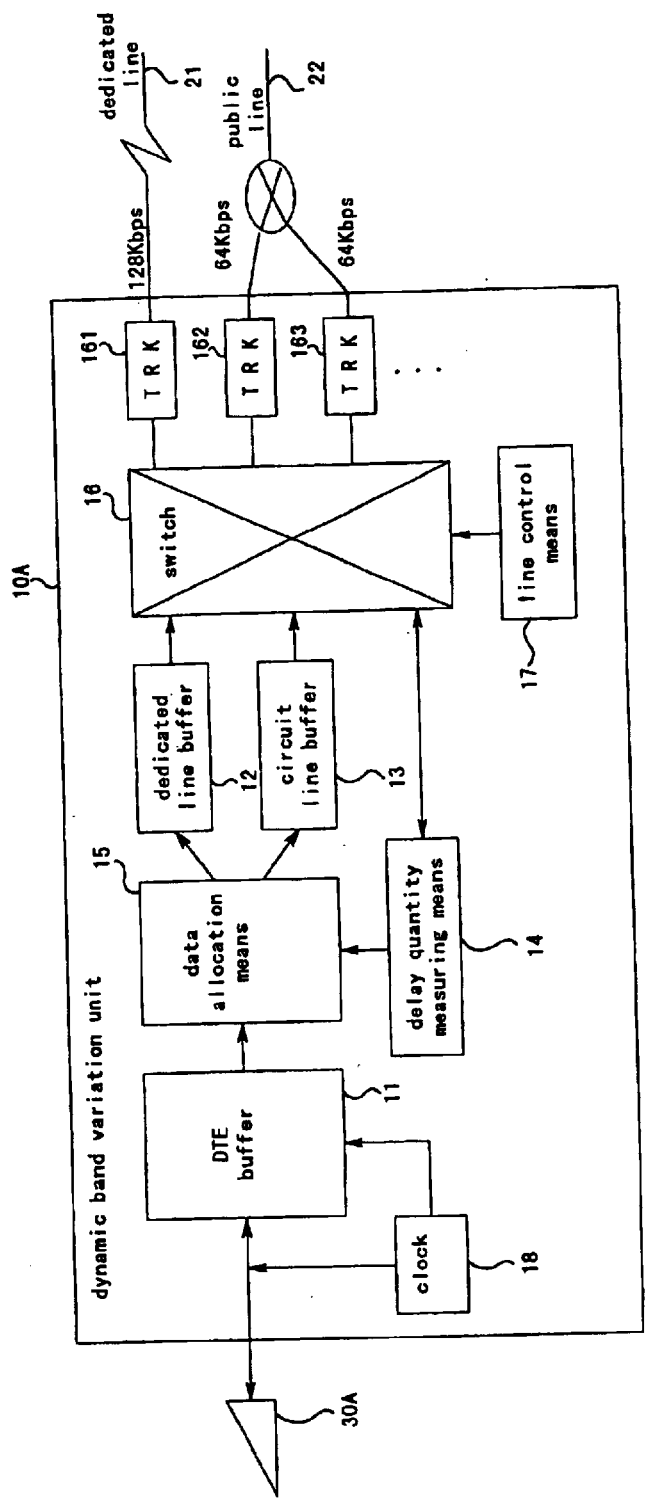
FIG. 2 is a block diagram showing the composition of the dynamic band variation unit to which the line switching system according to the present invention is applied.

The detailed composition of the dynamic band variation unit 10 will be explained with reference to FIG. 2.

The dynamic band variation unit 10 comprises a DTE buffer 11, a dedicated line buffer 12, a circuit line buffer 13, a delay quantity measuring means 14, a data allocation means 15, a switching circuit 16, a line control means 17, and a clock means 18.

The DTE buffer 11 operates by a clock signal from the clock means 18 and temporarily stores the transmitted data from the data terminal device 30A.

The dedicated line buffer 12 is a buffer for temporarily storing the data to be sent out to a dedicated line 21, and has a size corresponding to the communication capacity of the dedicated line.

The circuit line buffer 13 is a buffer for temporarily storing the data to be sent out to a switching circuit line 22, and has a size corresponding to the communication capacity of the switching circuit line.

The delay quantity measuring means 14 is a means for measuring the difference between the line delay time of the dedicated line 21 and the line delay time of the switching circuit line 22. The cells sent out with the same timing to each of the lines are received by the dynamic band variation unit on the other end, and the time difference in receiving the two cells is detected so as to determine the line delay quantity.

In the present specification, the difference in the line delay time of the above two lines is called the line delay quantity.

The data allocation means 15 allocates the data read out from the DTE buffer 11 to the dedicated line buffer 12 and the circuit line buffer 13.

The allocation of the data to the dedicated line buffer 12 and the circuit line buffer 13 is performed in proportion to the communication speed of each line.

Further, the starting of the data allocation is determined based on the above-mentioned line delay quantity. When data corresponding to the line delay quantity is stored in the DTE buffer, the allocation is started.

The allocation of the data is performed as follows. The portion of the data stored in the DTE buffer 11 up to a time corresponding to the time of the line delay quantity is allocated to the line buffer having a larger line delay quantity. The portion of the data stored in the DTE buffer 11 subsequent to a period of time corresponding to the time of the line delay quantity of said data allocated to the line buffer having a large line delay quantity is allocated to the line buffer having a small line delay quantity.

The switching circuit 16 works as an electronic switching system and connects the data applied to an input port to a predetermined line through trunks (TRK) 161, 162 and so on.

The line control means 17 controls the connection of calls or connects the switching circuit.

The clock means 18 generates clock signals such as a data transmission clock signal for DTE 10, a clock signal for the DTE buffer, a clock signal for the dedicated line buffer, and a clock signal for the circuit buffer.

When data is transmitted through a plurality of lines, the DTE is operated by the clock signal with a speed corresponding to the sum of the communication speed of the plurality of lines, and the writing of the data to the DTE buffer 11 is also performed by a clock signal having the same speed.

FIGS. 1 through 5 are used to explain the flow of data and the process flow when the data is received from the data terminal device 30A and transmitted in the trunk line direction when the line is connected.

Figure 3:
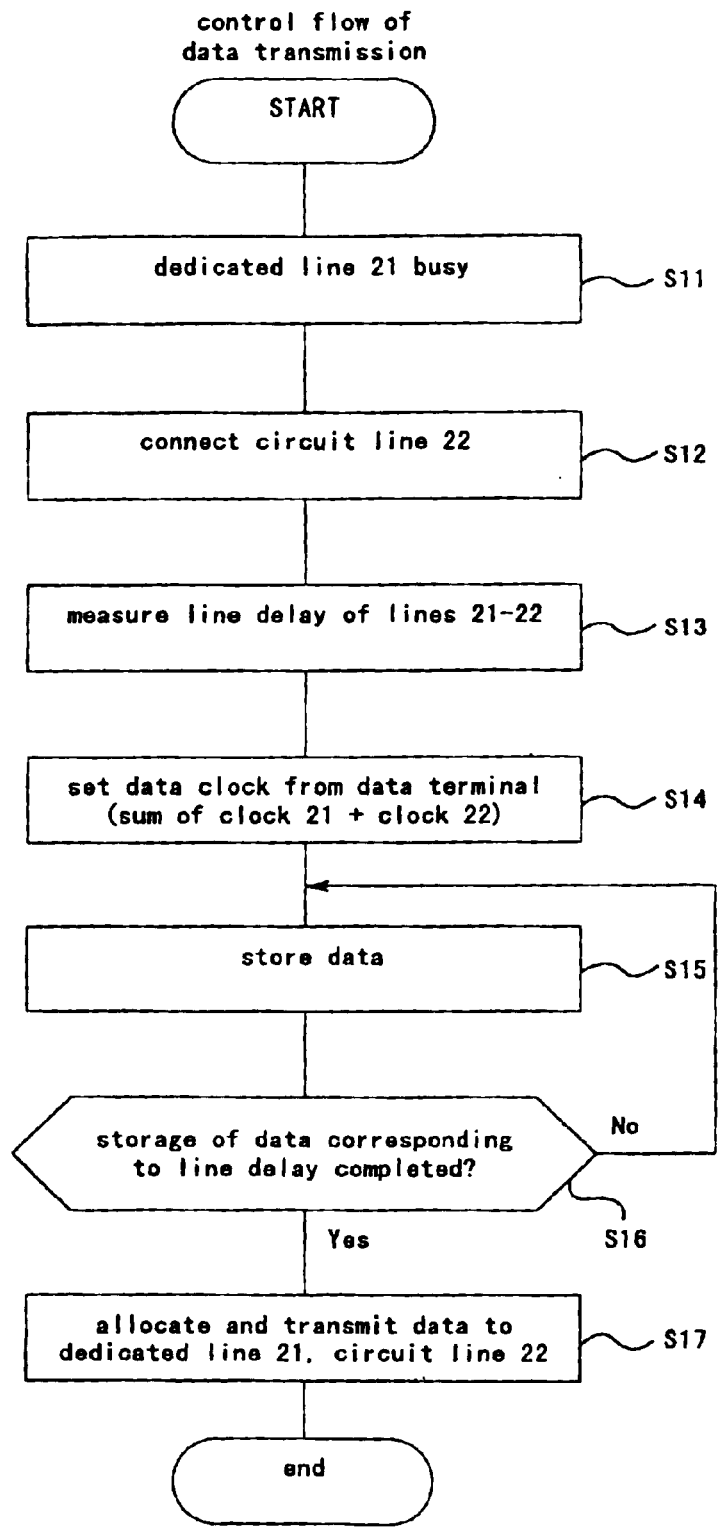
FIG. 3 is a process flowchart explaining the control of the dynamic band variation unit transmitting the data.
Figure 4:
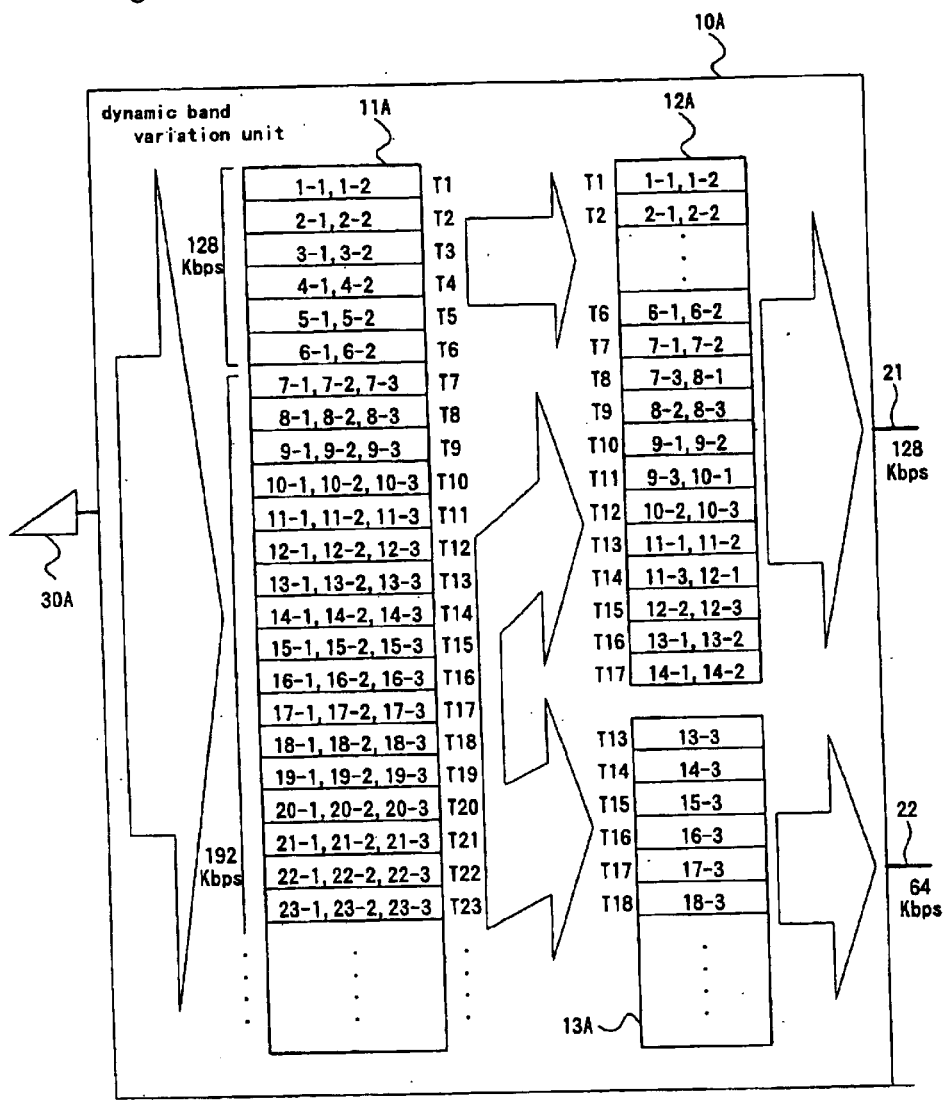
FIG. 4 is an explanatory view of the data transfer process of the dynamic band variation unit transmitting the data.
Figure 5:
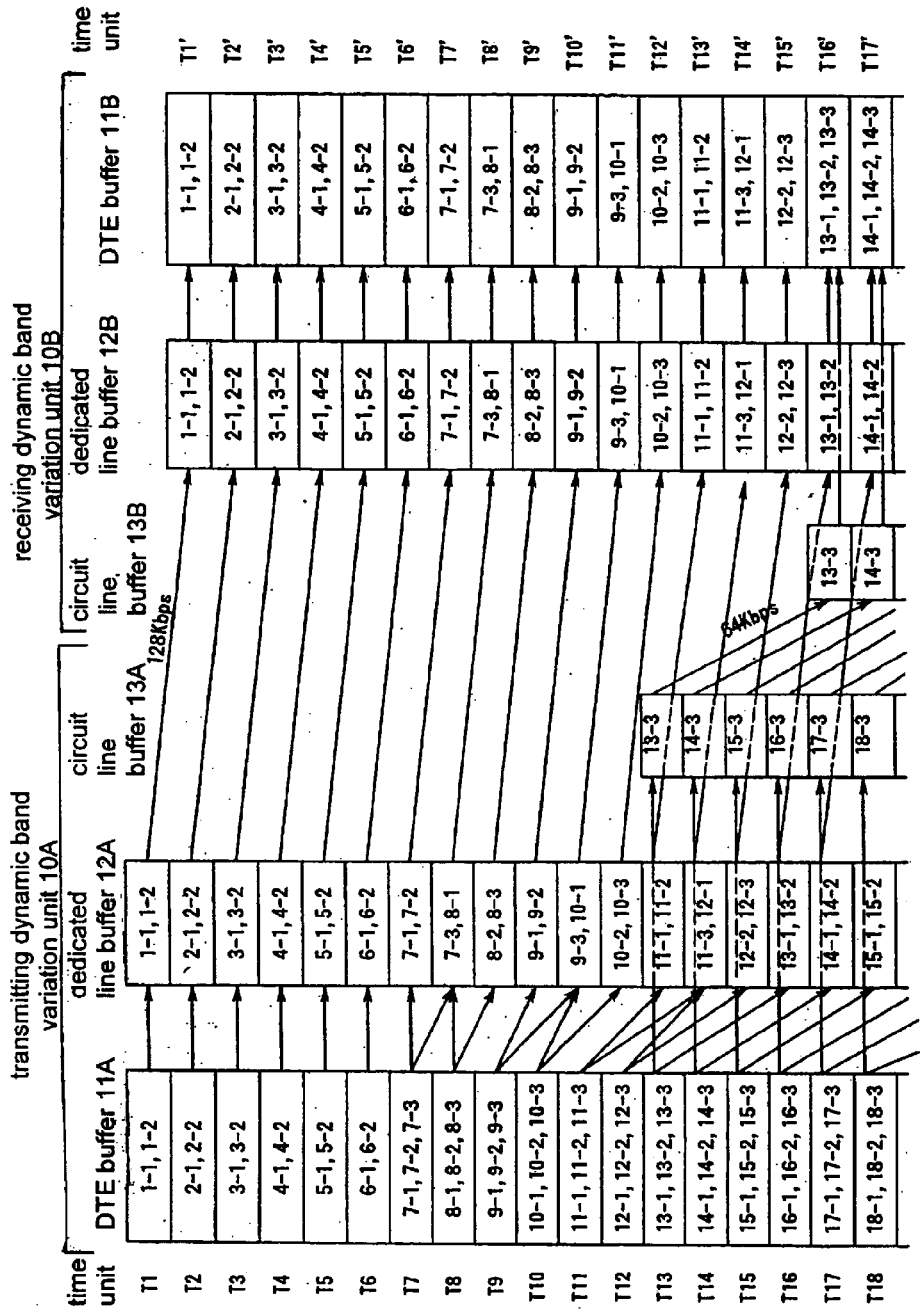
FIG. 5 is an explanatory view showing the state of the data transferred between the dynamic band variation units.

FIG. 3 shows the data transmission control flow in the dynamic band variation unit 10A on the data transmission side. FIG. 4 shows the flow of data in the dynamic band variation unit 10A, and FIG. 5 shows the flow of data between the dynamic band variation unit 10A on the transmitting side and the dynamic band variation unit 10B on the receiving side.

In the present explanation, the dedicated line 21 has a communication speed of 128 Kbps, and the line switching circuit 22 (hereinafter called the circuit line 22) has a communication speed of 64 Kbps. An example is explained where the circuit line 22 is additionally used when communicating data through the dedicated line 21 at a communication speed of 128 Kbps, thereby transmitting data at a communication speed of 192 Kbps in total.

For means of explanation, it is assumed that the dedicated line 21 has a line delay time of one time unit (for example, 18 msec), and the circuit line 22 has a line delay time of four time units. Thereby, the line delay quantity equals three time units, and the data that traveled through the circuit line 22 will be delayed for three time units compared to the data that traveled through the dedicated line 21.

When the data is communicated through the dedicated line 21 (FIG. 3, S11), the data is sent out from the DTE 30A from a time unit T1 to a time unit T16 at a communication speed of 128 Kbps. Per one time unit, 288 bytes of data is stored to the DTE buffer 11. In FIGS. 4 and 5, 144 bytes of data is shown as one unit.

In time unit T1, 288 bytes of data 1-1, 1-2 are stored in the DTE buffer 11, and the data is then transferred to the dedicated line buffer 12, and transmitted through the dedicated line 21.

In time unit T2, the data 2-1, 2-2 are stored in the DTE buffer 11, and the data are then transferred to the dedicated line buffer 12 and transmitted through the dedicated line 21.

Similarly during time unit T3 through time unit T6, the data 3-1 through 6-2 are transmitted to the dedicated line 21 by units of 288 bytes.

When a condition to increase the data communication quantity from the data terminal device 30A, such as an increase of traffic and the like, is fulfilled at time unit T7 while data is communicated between the data terminal device 30A and the data terminal device 30B through the dedicated line 21, a call is generated from the dynamic band variation unit 10A through the circuit line 22, so as to form a connection with the opposing dynamic band variation unit 10B (FIG. 3, S12).

When the connection in the circuit line 22 is completed, the line delay quantity of the dedicated line 21 and the circuit line 22 is measured (FIG. 3, S13).

The measurement of the line delay quantity is performed for example as follows. The delay quantity measuring means 14 outputs the same data at the same timing to the opposing dynamic band variation unit 10B through both the dedicated line 21 and the circuit line 22. Based on the line delay time of the data received by the dynamic band variation unit 10B through the dedicated line 21 and the data received through the circuit line 22, the line delay quantity data, which is the difference between the two line delay times measured above, is determined. This line delay quantity data is notified to the dynamic band variation unit 10A on the transmission side.

In the example shown in FIGS. 4 and 5, the time needed to measure the line delay quantity data and the time need to notify that data to the dynamic band variation unit 10A on the transmission side is assumed to be 0, so as to simplify the explanation.

Simultaneously with the measurement of the line delay quantity data, the clock means 18 sets the data transfer clock speed, from the data terminal device 30A to the DTE buffer 11A, to the sum speed (for example, 192 Kbps) of the transfer clock speed of the dedicated line 21 (for example, 128 Kbps) and the transfer clock speed of the circuit line 22 (for example, 64 Kbps) FIG. 3, S14).

At time unit T7, the data 7-1, 7-2, 7-3 having a total of 432 bytes transmitted from the data terminal device 30A at a communication speed of 192 Kbps is stored in the DTE buffer 11. The data 7-1, 7-2 of 288 bytes written at time unit T7 is transferred to the dedicated line buffer 12 and sent out to the dedicated line 21.

The data 7-3 of 144 bytes will remain in the DTE buffer 11 (FIG. 3, S15).

At time unit T8, the data 8-1, 8-2, 8-3 transmitted from the data terminal device 30A is stored in the DTE buffer 11. The data 7-3 written at time unit T7 and the data 8-1 written at time unit T8 are transferred to the dedicated line buffer 12 and sent out to the dedicated line 21.

The data 8-2, 8-3 of 288 bytes remains in the DTE buffer 11.

Similarly, at time unit T9, the data 9-1, 9-2, 9-3 from the data terminal device 30A are stored to the DTE buffer. The remaining 288-byte-data 8-2, 8-3 written at time unit T8 are transferred to the dedicated line buffer 12 and outputted to the dedicated line 21.

The data 9-1, 9-2, 9-3 of 432 bytes remains in the DTE buffer 11 (FIG. 3, S15).

As explained, 144 bytes of data per one time unit stored are in the DTE buffer 11.

The above-mentioned process is repeatedly performed, and at time unit T12, the 432 bytes of data 12-1, 12-2, 12-3 from the data terminal device 30A are stored in the DTE buffer. The 288 bytes of data 10-2, 10-3 written at time unit T10 are transferred to the dedicated line buffer 12 and outputted to the dedicated line 21.

A total of 864 bytes of data comprising the data 11-1, 11-2, 11-3 written at time unit T11 and the data 12-1, 12-2, 12-3 written at time unit T12 remain in the DTE buffer 11.

At time unit T13, it is detected that data corresponding to the line delay quantity are stored in the DTE buffer 11 (FIG. 3, S16). The 432 bytes of data 13-1, 13-2, 13-3 from the data terminal device 30A are stored in the DTE buffer 11, and the 288 bytes of data 11-1, 11-2 written at time unit T11 are transferred to the dedicated line buffer 12, and outputted to the dedicated line 21. At the same time, the 144 bytes of data 13-3 written at time unit T13 are transferred to the circuit line buffer 13, and transmitted to the circuit line 22 (FIG. 3, S17).

The 144 bytes of data 11-3 written at time unit T11, the 432 bytes of data 12-1, 12-2, 12-3 written at time unit T12, and the 288 bytes of data 13-1, 13-2 written at time unit T13, which total to 864 bytes of data, remain in the DTE buffer 11.

At time unit T14, the data 14-1, 14-2, 14-3 from the data terminal device 30A are stored in the DTE buffer 11. The 144 bytes of data 11-3 written at time unit T11 and the 144 bytes of data 12-1 written at time unit T12, which total 288 bytes of data, are transferred to the dedicated line buffer 12 and outputted to the dedicated line 21. The data 14-3 written at time unit T14 are transferred to the circuit line buffer 13 and outputted to the circuit line 22.

The data 12-2, 12-3 written at time unit T12, the data 13-1, 13-2 written at time unit T13 and the data 14-1, 14-2 written at time unit T14, which total to 864 bytes of data, remain in the DTE buffer 11.

At time unit T15, the data 15-1, 15-2, 15-3 from the data terminal device 30A are stored in the DTE buffer 11. The data 12-2, 12-3 written at time unit T12 are transferred to the dedicated line buffer 12 for output to the dedicated line 21. At the same time, the data 15-3 written at time unit T15 are transferred to the circuit line buffer 13 and outputted to the circuit line 22.

The data 13-1, 13-2 written at time unit T13, the data 14-1, 14-2 written at time unit T14, and the data 15-1, 152 written at time unit T15, which total to 864 bytes of data, remain in the DTE buffer 11.

At time unit T16, the data 16-1, 16-2, 16-3 from the data terminal device 30A are stored in the DTE buffer 11. The data 13-1, 13-2 written at time unit T13 are transferred to the dedicated line buffer 12 for output to the dedicated line 21. At the same time, the data 16-3 written at time unit T16 are transferred to the circuit line buffer 13 and outputted to the circuit line 22.

The data 14-1, 14-2 written at time unit T14, the data 15-1, 15-2 written at time unit T15, and the data 16-1 and 16-2 written at time unit T16, which total 864 bytes of data, remain in the DTE buffer 11.

Similarly, the amount of data corresponding to the line delay quantity, in other words the amount of data that may be transferred through a communication path having a smaller line delay time than three time units, may be stored in the DTE buffer 11, and the data inputted during the present time unit are outputted to the circuit line 22 having a delay quantity corresponding to three time units. At the same time, the data written three time units earlier are outputted to the dedicated line 21, and the data are communicated with a total speed of 192 Kbps.

The amount of data stored in the DTE buffer 11, in other words the data quantity Db corresponding to the line delay quantity, may be shown by formula (1), in which the communication speed of the line having a small line delay time is shown as Sd.

$$Db = Td \times Sd \quad (1)$$

Moreover, the time needed after adding a new communication path during communication before transferring the data to the additional transmission path, that is, time Ts needed to store the amount of data Db corresponding to the line delay time, may be shown by formula (2), wherein the communication speed of the line having a small line delay time is shown as Sd, and the total communication speed of the line is shown as St.

$$Ts = Db / St - Sd \quad (2)$$

Even further, when adding another line while communicating through a plurality of lines, the amount of data stored in the DTE buffer 11 or the amount of data Db corresponding to the line delay quantity may be shown by formula (3), wherein the line delay quantity shown by the difference between the line delay time of the line having the smallest line delay time and the line delay time of the line having the largest line delay time is shown as Td, and the total speed of communication by the plurality of lines other than the newly added line is shown as Ss.

$$Db = Td \times Ss \quad (3)$$

Figure 6:
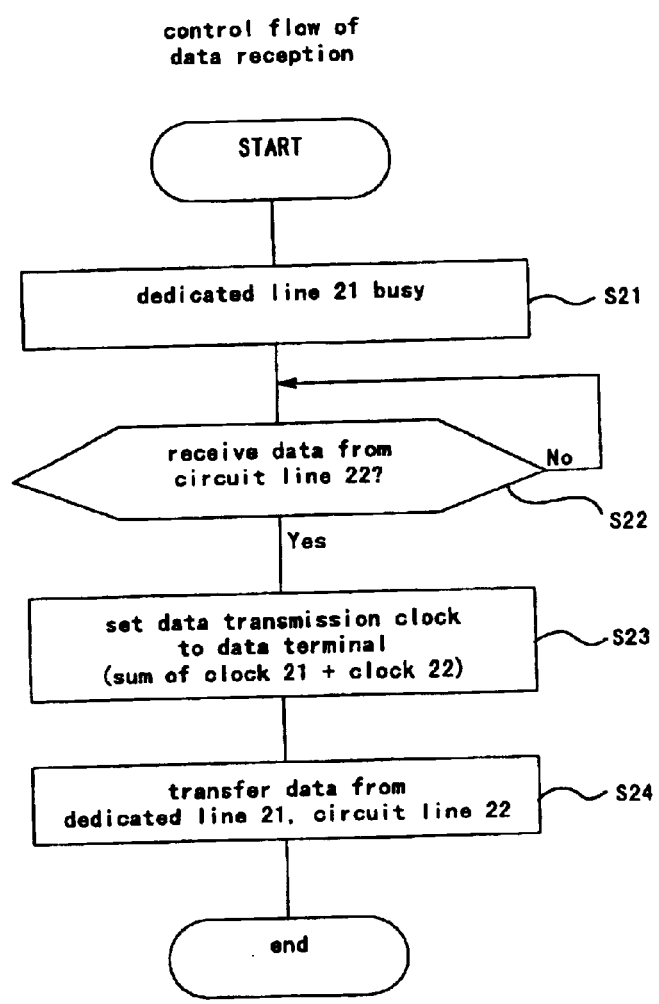
FIG. 6 is a process flowchart explaining the control of the dynamic band variation unit receiving the data.
Figure 7:
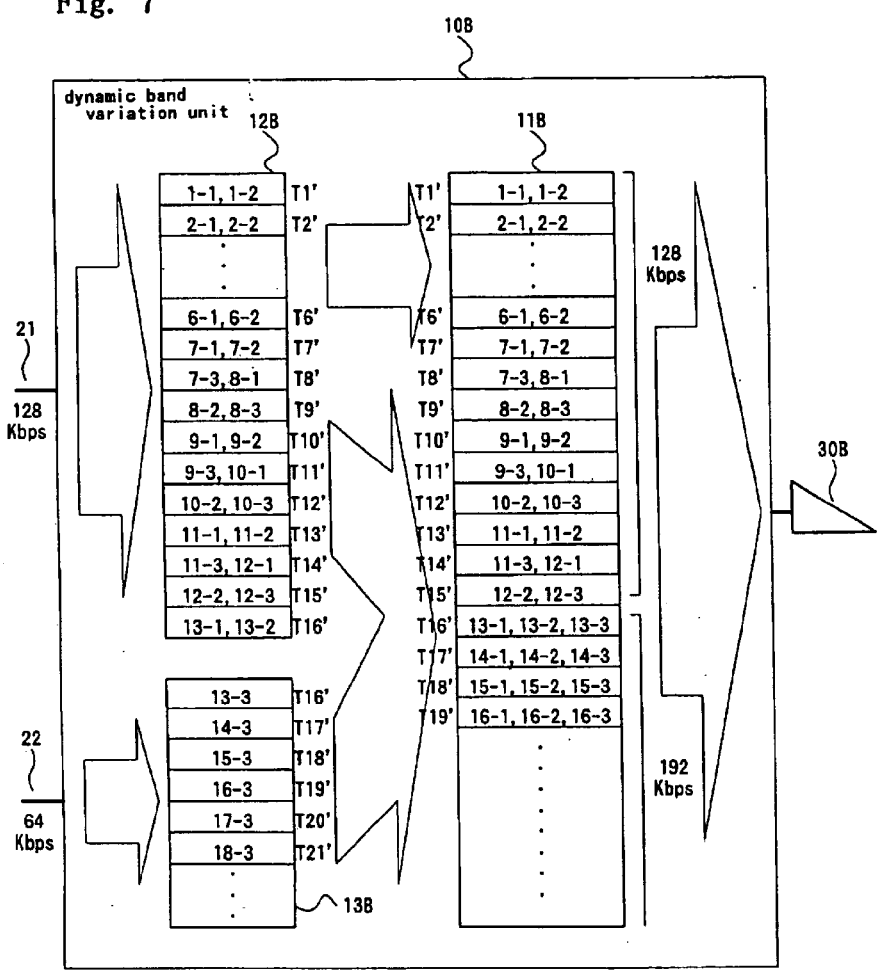
FIG. 7 is an explanatory view of the example of a data transfer process by the dynamic band variation unit receiving the data.

With reference to FIGS. 5 through 7, the process flow for transferring the data received by the dynamic band variation unit 10B on the receiving side at the data terminal device 30B when an additional line is added during communication shown in FIGS. 4 and 5 is explained.

In the present embodiment, the line delay time of the dedicated line 21 is assumed to be one time unit. Therefore, the data transmitted to the dedicated line 21 at time unit T1 will reach the receiving dynamic band variation unit 10B at time unit T2. However, in order to match the time unit of the transmitting unit and that of the receiving unit, the time unit at which the first data arrives at the receiver is explained as T1'.

At time unit T1', the 288 bytes of data 1-1, 1-2 sent out at time unit T1 through the dedicated line 21 are received by the dedicated line buffer 12B.

The data 1-1, 1-2 will be transferred to the DTE buffer 11B, and further transferred to the data terminal device 30B at a communication speed of 128 Kbps (FIG. 6, S21).

Similarly, the data 2-1 through 7-2 sent out through the dedicated line 21 during time units T2 through T7 are received at time units T2' through T7' by the dedicated line buffer 12B in units of 288 bytes.

The data 2-1 through 7-2 are transferred to the DTE buffer 11B and further transferred to the data terminal device 30B at a communication speed of 128 Kbps.

At time unit T8', the 144-byte-data 7-3 sent out at time unit T7 and the 144-byte-data 8-1 sent out at time unit T8 through the dedicated line 21 are received at the dedicated line buffer 12B.

The data 7-3, 8-1 are transferred to the DTE buffer 11B and further transferred to the data terminal device 30B at a communication speed of 128 Kbps.

At time unit T9', the 288 bytes of data 8-2, 8-3 sent out at time unit T8 through the dedicated line 21 are received at the dedicated line buffer 12B.

The data 8-2 and 8-3 are transferred to the DTE buffer 11B and further transferred to the data terminal device 30B at a communication speed of 128 Kbps.

Similarly, at time units T10'T15', the 288 bytes of data 9-1, 9-2 transmitted at time unit T9 to the 288 bytes of data 12-2, 12-3 transmitted at time unit T15 through the dedicated line 21 are received at the dedicated line buffer 12B.

The data 9-1 through 12-3 are transferred to the DTE buffer 11B in units of 288 bytes and further transferred to the data terminal device 30B at a communication speed of 128 Kbps.

During this time, it is observed whether data are received from the circuit line 22 (FIG. 6, S22).

When data from the circuit line 22 are received at time unit T16' (FIG. 6, S22), the clock generation means 18B sets a 192 Kbps data reception clock signal to the data terminal device 30B (FIG. 6, S23). The receiving dynamic band variation unit 10B receives the 288-byte-data 13-1, 13-2 sent out at time unit T16 through the dedicated line 21 by the dedicated line buffer 12B, and at the same time, receives the 144-byte-data 13-3 sent out at time unit T13 through the circuit line 22 by the circuit line buffer 13B.

The 288 bytes of data 13-1, 13-2 received by the dedicated line buffer 12B and the 144 bytes of data 13-3 received by the circuit line buffer 13B are transferred to the DTE buffer 11B and further transferred to the data terminal device 30B at a communication speed of 192 Kbps (FIG. 6, S24).

After that, a data unit of 432 bytes in total arriving with the same timing through both the dedicated line 21 and the circuit line 22 are transferred to the DTE 30B through the DTE buffer 11B at a communication speed of 192 Kbps.

Thereafter, 432 bytes of data in total are received by the dedicated line buffer 12B and the circuit line buffer 13B and will be transferred to the DTE 30B through the DTE buffer 11B at a communication speed of 192 Kbps.

When communicating according to the above-mentioned steps, it may be possible to transfer the data transmitted from the data terminal device 30A to the data terminal device 30B without any data loss.

The steps for cutting the circuit line 22 and reducing the communication quantity of the data will now be explained.

When a condition, such as reduction in traffic and the like, is fulfilled to reduce the data communication quantity from the data terminal device 30A, the dynamic band variation unit 10A sets the transmission clock (192 Kbps) of the data transmitted from the data terminal device 30A to the communication speed of the dedicated line, which is 128 Kbps. When transmission of the data through the dedicated line 21 and the circuit line 22 is continued under such condition, the amount of data stored in the DTE buffer 11A will be reduced in proportion to time. When the stored data are gone, the transmission of the data to the circuit line 22 is stopped, so as to return to the state where communication is performed only by the dedicated line 21.

On the other hand, when the receiving dynamic band variation unit 10B detects that no more data are transmitted through the circuit line 22 while receiving data from both the dedicated line 21 and the circuit line 22 as shown in FIG. 7, the transfer of data from the circuit line buffer 13B to the DTE buffer 13B is terminated, and the data reception clock signal to the data terminal device 30B is set to the communication speed of the dedicated line 21 (128 Kbps).

This process enables recovery of the initial communication state where only the dedicated line 21 is used for the communication of data.

As mentioned above, the present invention provides a data communication system using a dynamic band variation unit where the lines used for communication may be increased or decreased while guaranteeing the data transmitted between two data terminal devices, and the data from one data terminal device may be allocated to a plurality of lines for communication to the other data terminal device.

We claim:

1. A line switching unit for switching data received on an input line to a plurality of output lines based on line delay times of the plurality of output lines, said line switching unit comprising:

means for measuring the line delay times of the plurality of output lines;

means for allocating the received data from the input line to said plurality of output lines based on the measured delay times;

a plurality of storing means, each corresponding to one of the plurality of output lines, for storing data allocated to the corresponding one of the plurality of output lines; and means, responsive to the measured line delay times, for controlling said allocation means to allocate the received data from the input line across the plurality of storing means based on the measured line delay times, wherein said means for controlling allocates to a first one of the output lines an amount of the received data from the input line, said amount corresponding to the measured line delay time of the first one of the output lines, and allocates subsequently received data from the input line to another of the output lines.

2. A line switching unit for switching data received on an input line to one of a plurality of output lines based on line delay times of the plurality of output lines, said line switching unit comprising:

means for measuring the line delay times of the plurality of output lines;

means for allocating the received data from the input line to said plurality of output lines based on the measured line delay times;

a first line buffer for storing data allocated to a first one of the plurality of output lines;

a second line buffer for storing data allocated to the others of the plurality of output lines; and means, responsive to the measured line delay times for controlling said allocation means to provide the received data from the input line to said first line buffer up to a time corresponding to a measured line delay time of the first one of the plurality of output lines, and to provide subsequently received data from the input line to the second line buffer.

* * * * *